United States Patent
Stapel et al.

(10) Patent No.: US 9,822,258 B2
(45) Date of Patent: Nov. 21, 2017

(54) CR(VI)-FREE CORROSION PROTECTION LAYERS OR ADHESION PROMOTER LAYERS PRODUCED USING A SOLUTION COMPRISING PHOSPHATE IONS AND METAL POWDER, WHEREIN THE METAL POWDER IS COATED AT LEAST PARTLY WITH SI OR SI ALLOYS

(71) Applicant: MTU Aero Engines AG, Munich (DE)

(72) Inventors: Martin Stapel, Munich (DE); Natividad Lopez Lavernia, Munich (DE); Max Niegl, Munich (DE); Max Morant, Aschau (DE)

(73) Assignee: MTU AERO ENGINES AG, Munich (DE)

( * ) Notice: Subject to any disclaimer, the term of this patent is extended or adjusted under 35 U.S.C. 154(b) by 491 days.

(21) Appl. No.: 14/384,262

(22) PCT Filed: Mar. 13, 2013

(86) PCT No.: PCT/DE2013/000142
§ 371 (c)(1),
(2) Date: Sep. 10, 2014

(87) PCT Pub. No.: WO2013/149606
PCT Pub. Date: Oct. 10, 2013

(65) Prior Publication Data
US 2015/0064354 A1 Mar. 5, 2015

(30) Foreign Application Priority Data
Apr. 3, 2012 (DE) .................. 10 2012 006 656

(51) Int. Cl.
C23C 22/74 (2006.01)
C23C 24/08 (2006.01)
C04B 14/30 (2006.01)
C04B 28/34 (2006.01)
C09D 5/08 (2006.01)
F01D 25/00 (2006.01)
C09D 1/00 (2006.01)
C04B 111/00 (2006.01)

(52) U.S. Cl.
CPC ............ C09D 5/084 (2013.01); C04B 28/346 (2013.01); C09D 1/00 (2013.01); C09D 5/08 (2013.01); C23C 22/74 (2013.01); C23C 24/082 (2013.01); F01D 25/005 (2013.01); F01D 25/007 (2013.01); C04B 2111/00525 (2013.01); F05D 2260/95 (2013.01)

(58) Field of Classification Search
CPC ......... C23C 22/74; C23C 24/082; C09D 5/08; C09D 5/084; C04B 28/346; C04B 14/303; C04B 14/304; C04B 2111/00525; F01D 25/007; F05D 2260/95
USPC ........... 106/1.25, 14.12; 427/328, 380, 383.7
See application file for complete search history.

(56) References Cited

U.S. PATENT DOCUMENTS

| | | | |
|---|---|---|---|
| 3,248,251 A | 4/1966 | Charlotte | |
| 5,242,488 A * | 9/1993 | Stetson | C23C 22/74 106/14.12 |
| 5,272,223 A * | 12/1993 | Iri | C09D 5/028 427/388.1 |
| 5,478,413 A * | 12/1995 | Mosser | C04B 14/303 148/261 |
| 5,723,078 A * | 3/1998 | Nagaraj | C23C 4/00 264/36.18 |
| 6,074,464 A | 6/2000 | Eddinger et al. | |
| 6,368,394 B1 | 4/2002 | Hughes et al. | |
| 6,379,804 B1 * | 4/2002 | Ackerman | B22F 1/0055 428/210 |
| 6,740,424 B2 | 5/2004 | Endo et al. | |
| 7,544,396 B2 | 6/2009 | Buczek et al. | |
| 7,601,400 B2 | 10/2009 | Buczek et al. | |
| 7,776,143 B2 * | 8/2010 | Hazel | C23C 22/74 106/14.12 |
| 2002/0017164 A1 | 2/2002 | Endo et al. | |
| 2006/0127694 A1 * | 6/2006 | Hazel | C23C 22/74 428/652 |
| 2006/0204665 A1 | 9/2006 | Buczek et al. | |
| 2006/0204666 A1 | 9/2006 | Buczek et al. | |
| 2007/0231586 A1 | 10/2007 | Albrecht et al. | |

FOREIGN PATENT DOCUMENTS

| | | |
|---|---|---|
| EP | 0933446 A1 | 8/1999 |
| EP | 1700929 A1 | 9/2006 |
| EP | 1700930 A1 | 9/2006 |
| WO | 2005052211 A1 | 6/2005 |

* cited by examiner

Primary Examiner — Helene Klemanski
(74) Attorney, Agent, or Firm — Abel Law Group, LLP

(57) ABSTRACT

The present invention relates to a coating material for the production of an anti-corrosion and/or adhesion promoter layer, which material comprises metal powder and a phosphate-ion-containing solution as the binder, the metal powder being at least partially coated with Si or Si alloys or the binder consisting of phosphoric acid and metal phosphates and being substantially free of chromates. The invention further relates to a method for producing an anti-corrosion and/or adhesion promoter layer, comprising the following steps: Providing a coating material, such as indicated above, applying the coating material to a component surface on which the anti-corrosion and/or adhesion promoter layer is to be created, and drying and/or hardening by way of a heat treatment at a first temperature.

20 Claims, No Drawings

CR(VI)-FREE CORROSION PROTECTION LAYERS OR ADHESION PROMOTER LAYERS PRODUCED USING A SOLUTION COMPRISING PHOSPHATE IONS AND METAL POWDER, WHEREIN THE METAL POWDER IS COATED AT LEAST PARTLY WITH SI OR SI ALLOYS

BACKGROUND TO THE INVENTION

Field of the Invention

The present invention relates to a coating material and also a process for producing a corrosion protection layer and/or adhesion promoter layer.

Discussion of Background Information

In metallic components which are exposed to high temperatures and/or corrosive media, for example components of flow machines in the form of stationary gas turbines or aircraft engines, the metallic surfaces have to be protected from oxidative and/or corrosive attack. Many different layer systems are known for this purpose in the prior art.

Use is made of, inter alia, phosphate layers in the case of which sparingly soluble phosphates are precipitated on the metal surface to be protected from a solution containing phosphate ions so as to form a protective layer which is firmly bonded to the metallic material to be protected and can therefore also serve as adhesion promoter layer for additional protective layers arranged on the phosphate layer.

In this type of coating of the metallic surface, metal cations from the phosphate solution can additionally contribute to the layer structure and provide a corrosion protection effect. For example, aluminum ions or aluminum particles can be provided in the phosphate solution in order to achieve accumulation of aluminum in the phosphate-based corrosion protection layer and/or adhesion promoter layer to be formed, with the aluminum being able to contribute to corrosion protection by formation of a slowly growing aluminum oxide layer. An example of such a coating material is given in the U.S. Pat. No. 3,248,251.

Such a coating material usually additionally contains chromates in order to make stabilization of the phosphate solution possible. Otherwise, particularly in the presence of metallic particles such as aluminum powder in the phosphate solution, reactions of the phosphoric acid with the metal powder or aluminum powder can occur. However, chromates and in particular chromium(VI) ions are toxic and hazardous to health, so that efforts have been made to remove chromates from such coating materials. An example is given U.S. Pat. No. 6,368,394 B1 in which a coating composition which comprises water, phosphate ions, borate ions and aluminum ions and has a pH in the range from 1.4 to 2.2 is proposed.

However, there continues to be a need to provide a coating material for a process for producing a phosphate-based corrosion protection layer and/or adhesion promoter layer and also a corresponding process in which, firstly, the stability of the coating material for the phosphate-based coating is ensured and, secondly, effective layer formation on the metallic component to be protected is also achieved.

DISCLOSURE OF THE INVENTION

Object of the Invention

It is therefore an object of the present invention to provide a composition or a coating material and a process for producing a corrosion protection layer and/or adhesion promoter layer, in which the abovementioned requirements are met. In particular, a composition or a coating material for treatment of a metallic surface is to be provided, which comprises phosphate ions in a solution in order to act as binder, with metal particles which are stably taken up in the phosphate solution without addition of chromium(VI) ions additionally to be present. Furthermore, a process for producing a corrosion protection layer and/or adhesion promoter layer using a phosphate-based composition which allows reliable and effective production of such corrosion protection layers and/or adhesion promoter layers should be provided.

Technical Solution

This object is achieved by a coating material and also a process for producing a corrosion protection layer and/or adhesion promoter layer as recited in the instant independent claims. Advantageous embodiments are provided in the dependent claims.

According to a first aspect, the invention proposes providing a coating material in the case of which the stability of the coating material composition and in particular the metallic components, for example aluminum components, is increased by using a metal powder and in particular an aluminum-containing powder which is at least partly coated with silicon or an Si alloy in the coating material.

The metal powder can, in particular, be an aluminum-containing powder so that aluminum is incorporated into the corrosion protection layer and/or bonding layer in order thereby to improve the corrosion resistance.

The silicon-coated aluminum-containing powder particles can, in respect of the aluminum core, be pure aluminum particles in the sense of technical-grade aluminum or aluminum alloy particles. The silicon-coated aluminum powder particles can, in respect of the aluminum core, be identical to the further, aluminum-containing powder particles of the coating material composition or differ from these in terms of size, shape and composition. This also applies correspondingly to metal powders which consist of metals other than aluminum or of metal alloys which are not Al alloys.

The metal powder present in the coating material can comprise from 60% to 99% of aluminum powder, in particular from 70% to 80%, preferably 75%, of aluminum powder, while the remainder of the metal powder can be silicon-coated aluminum powder. The percentages can be either percentages by weight or percentages by volume, with the corresponding ratios of uncoated metal powder to coated metal powder also being applicable to metal powders composed of metals other than aluminum or alloys other than Al alloys.

The binder in the form of the solution containing phosphate ions can comprise from 1 to 10% of magnesium phosphate, from 1 to 10% of aluminum phosphate and from 80 to 90% of phosphoric acid, where the percentages can once again be percentages by volume or percentages by weight.

In such a binder purely on the basis of phosphate, pure aluminum powder can also be used as metal powder, so that, according to a further aspect of the invention, protection is sought for this, independently and on a stand-alone basis.

The mixing ratio between metal powder and binder can be selected so that there are from 5 to 10 parts by weight, in particular from 6 to 8 parts by weight, of metal powder per 10 parts by weight of binder.

According to a further aspect of the present invention, for which protection is sought independently and in combination with other aspects of the invention, a process for producing a corrosion protection layer and/or adhesion promoter layer, in which a coating material as described above is used, is employed. The corresponding coating material is, for example, applied, for example by painting, dipping of the corresponding component into the coating material or by spraying of the coating material, to the component area on which the corrosion protection layer and/or adhesion promoter layer is to be produced. The component area which has been treated or provided with coating material in this way is subjected to a heat treatment at a first temperature in order to dry and/or cure the coating material or polymerize the phosphates. A further heat treatment at a second temperature which is higher than the first temperature can then take place.

The first temperature can, for example, be selected in the range from 250° C. to 400° C., preferably from 300° C. to 350° C., while the second temperature can be selected in the range from 500° C. to 600° C., preferably from 550° C. to 570° C.

Before application of the coating material to the component surface to be treated, the latter can be blasted with particles in order to obtain a metallic and clean surface, in particular using aluminum oxide particles.

The coating material can be produced by mixing the powder particles with the solution containing phosphate ions immediately before use in order to obtain the effectiveness of the phosphate ions for treatment of the metallic surface to be coated.

The layer produced can be sealed and/or densified after carrying out the first and/or second heat treatment.

The corresponding coating or treatment can be provided particularly in the case of steel components which can have a use temperature of up to 600° C. Apart from coating of steel, it is also possible to coat other metallic materials, e.g. nickel-based alloys, especially when the layer is used as bond coat for thermally sprayed layers or adhesives and/or the components are used at operating temperatures below 600°.

EXAMPLE

A chromium(VI)-free composition as per an example comprises 75% by weight of aluminum powder particles and 25% by weight of silicon-coated aluminum powder particles. These are dispersed in a solution containing phosphate ions, so that the solution containing phosphate ions serves as binder. However, it is also possible to use pure Al powder.

Such a coating material is sprayed or brushed onto a surface which has been blasted with aluminum oxide particles and is heated for drying and/or curing at about 320° C. until the binder has been dried and/or cured and the sparingly soluble phosphates have been polymerized.

A further heat treatment at a temperature of 560° C. can then be carried out and a layer produced in this way can additionally be sealed and/or densified. In addition, a further corrosion protection layer and/or oxidation protection layer can be applied to the correspondingly produced layer, for example in the form of a thermally sprayed layer. The layer produced according to the present invention can likewise be used as bond coat for thermally sprayed layers. If the layer is used as bond coat for thermally sprayed layers or for adhesives, it is possible to use components made of any alloys (e.g. Ni-based alloys). However, the component temperature then has to remain at or below 600° C. (operating temperature).

Although the present invention has been described in detail in relation to the example, the invention is not restricted to this example but can comprise modifications such as, for example, omission of individual features or a combination of different features as long as the scope of protection of the accompanying claims is not departed. The present disclosure comprises all combinations of all individual features presented.

What is claimed is:

1. A coating material for producing a corrosion protection layer and/or adhesion promoter layer, wherein the coating material comprises metal powder and a solution containing phosphate ions as binder, and wherein the metal powder comprises (a) from 60% to 99% of Al powder and (b) from 1% to 40% of Al powder coated with Si or Si alloys.

2. The coating material of claim 1, wherein the metal powder comprises Al-containing powder which comprises technical-grade aluminum or Al alloys.

3. The coating material of claim 1, wherein the metal powder comprises (a) from 65% to 90% of Al powder and (b) from 10% to 35% of Al powder coated with Si or Si alloys.

4. The coating material of claim 1, wherein the binder comprises from 1% to 10% of magnesium phosphate, from 1% to 10% of aluminum phosphate and from 80% to 90% of phosphoric acid.

5. The coating material of claim 1, wherein the coating material comprises from 5 to 10 parts by weight of metal powder per 10 parts by weight of binder.

6. The coating material of claim 1, wherein the coating material comprises from 6 to 8 parts by weight of metal powder per 10 parts by weight of binder.

7. A coating material for producing a corrosion protection layer and/or adhesion promoter layer, wherein the coating material comprises (i) a binder which consists of phosphoric acid and metal phosphates and is substantially free of chromates and (ii) metal powder comprising Al-containing powder which comprises technical-grade aluminum or Al alloys, from 60% to 99% of the powder being Al powder and from 1% to 40% of the powder being Al powder coated with Si or Si alloys.

8. The coating material of claim 7, wherein the metal powder comprises from 65% to 90% of Al powder and from 10% to 35% of Al powder coated with Si or Si alloys.

9. The coating material of claim 7, wherein the binder comprises from 1% to 10% of magnesium phosphate, from 1% to 10% of aluminum phosphate and from 80% to 90% of phosphoric acid.

10. The coating material of claim 7, wherein the coating material comprises from 5 to 10 parts by weight of metal powder per 10 parts by weight of binder.

11. The coating material of claim 7, wherein the coating material comprises from 6 to 8 parts by weight of metal powder per 10 parts by weight of binder.

12. A process for producing a corrosion protection layer and/or adhesion promoter layer, wherein the process comprises applying the coating material of claim 1 to a component area on which the corrosion protection layer and/or adhesion promoter layer is to be produced, followed by drying and/or curing the applied coating material with a heat treatment at a first temperature.

13. The process of claim 12, wherein the process further comprises blasting a surface to be treated with particles prior to applying the coating material.

14. The process of claim 12, wherein the first temperature ranges from 250° C. to 400° C.

15. The process of claim 14, wherein a further heat treatment at a second temperature ranging from 500° C. to 600° C. is carried out.

16. The process of claim 12, wherein the coating material is applied on an area of a steel component of a gas turbine or aircraft engine.

17. A process for producing a corrosion protection layer and/or adhesion promoter layer, wherein the process comprises applying the coating material of claim 7 to a component area on which the corrosion protection layer and/or adhesion promoter layer is to be produced, followed by drying and/or curing the applied coating material with a heat treatment at a first temperature.

18. The process of claim 17, wherein the process further comprises blasting a surface to be treated with particles prior to applying the coating material.

19. The process of claim 17, wherein the first temperature ranges from 250° C. to 400° C.

20. The process of claim 19, wherein a further heat treatment at a second temperature ranging from 500° C. to 600° C. is carried out.

\* \* \* \* \*